Oct. 23, 1956  S. H. FILLION  2,767,858
CUSHIONING DEVICES WITH FRICTION DAMPING MEANS
Filed Oct. 23, 1953  2 Sheets-Sheet 2

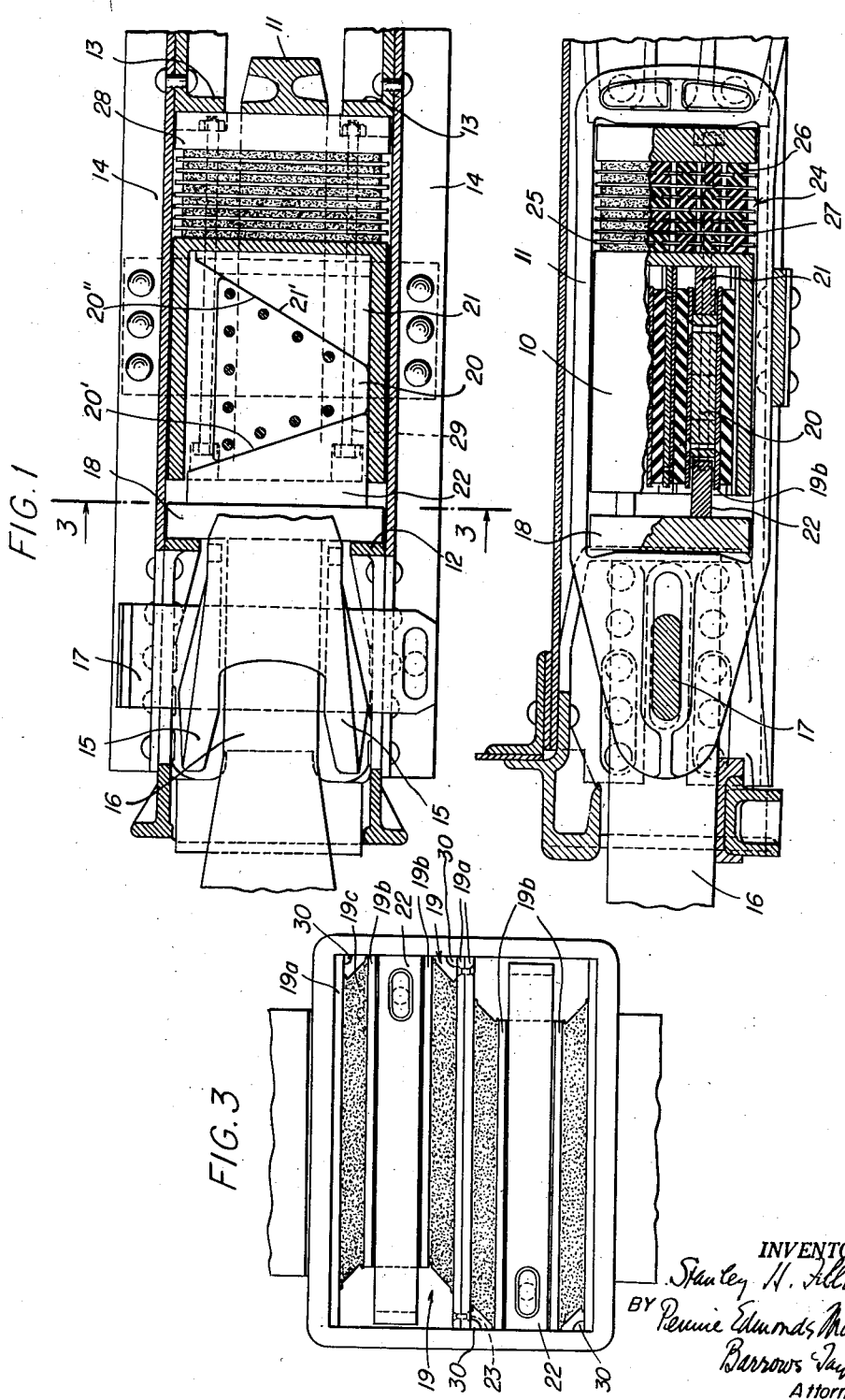
Oct. 23, 1956     S. H. FILLION     2,767,858
CUSHIONING DEVICES WITH FRICTION DAMPING MEANS
Filed Oct. 23, 1953     2 Sheets-Sheet 1

INVENTOR.
Stanley H. Fillion
BY
Penne Edmonds Morton
Barrows & Taylor
Attorneys

United States Patent Office 2,767,858
Patented Oct. 23, 1956

2,767,858

CUSHIONING DEVICES WITH FRICTION DAMPING MEANS

Stanley H. Fillion, Scarsdale, N. Y., assignor to Waugh Equipment Company, New York, N. Y., a corporation of Maine Application October 23, 1953, Serial No. 387,972

9 Claims. (Cl. 213—45)

This invention relates to cushioning devices, in which part of the applied energy is absorbed by conversion into frictional heat and dissipation of such heat, while the remainder is stored in the device and is available for restoration of the device to its original condition. More particularly, the invention is concerned with a novel cushioning device, which has large capacity and occupies relatively little space, so that it is well adapted for use as a draft gear for railway vehicles. The new device is similar to that disclosed and claimed in my prior co-pending application, Ser. No. 373,717, filed August 12, 1953, but differs from the device of that application, in that it provides greater capacity in approximately the same volume.

In its simplest form, the device of the prior application comprises a pair of rubber shear blocks, each consisting of a pair of metal plates lying parallel and a mass of rubber between the plates and bonded to areas on their opposed surfaces. One plate of each shear block is fixed in position and the other is movable relatively to the first against the resistance of the rubber in shear. The movable plates of the two shear blocks are attached to a shoe, which is movable with the plates along the friction surface of a stationary wedge member. The friction surface on the wedge lies at an angle to the path of travel of the shoe and the shoe has a pair of friction surfaces lying at an angle to each other with one making extended contact with the wedge and the other engageable with a similar friction surface on a movable plunger. In the use of the device, compressive forces are applied to the plunger and, when the device is used as a draft gear, the shear blocks, shoe, and wedge are enclosed in a housing, out of which the plunger projects. In such a gear, the device is installed in a draft pocket within a yoke attached to the coupler and lies between followers engageable with draft stops at the ends of the pocket.

While the prior device is satisfactory for use in a draft gear, there is a possibility of the gear going solid, that is, reaching a condition, in which forces are transmitted through the gear between the coupler and the car structure along an unyielding path. A draft gear, in which the cushioning device of the present invention is employed, can not go solid and, in addition, the gear has a greater capacity than one utilizing the prior device.

The new device comprises one or more pairs of shear blocks and a movable abutment engaged by one plate of each shear block. The second plate of each shear block is movable relatively to the first plate of the shear block against the resistance of the rubber in shear and the relatively movable plate is attached to a friction shoe movable along a wedge member. The wedge is seated against the abutment and movement of the latter is resisted by resilient elements, preferably taking the form of rubber springs. The movement of each shoe is effected by a plunger and the shoe and its plunger have engaging friction surfaces. The shear blocks, wedges, and shoes may be enclosed within a housing, which contains the movable abutment and the resilient elements resisting its movement, or, if preferred, the closed end of the housing may serve as the abutment and the resilient elements may lie outside the housing.

For a better understanding of the invention, reference may be had to the accompanying drawings, in which Fig. 1 is a top plan view, with parts broken away, of the new cushioning device employed as a draft gear;

Fig. 2 is a view in side elevation, with parts broken away, of the draft gear shown in Fig. 1;

Fig. 3 is a sectional view on the line 3—3 of Fig. 1;

Figure 5:
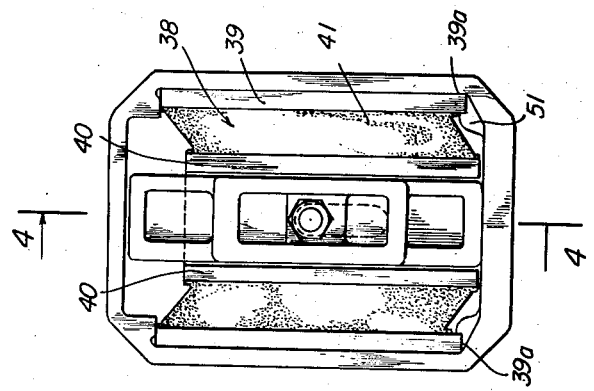
Fig. 5 is an end view, taken from the right, of the device shown in Fig. 4.

The draft gear illustrated in Figs 1–3, inclusive, comprises a housing 10, which is oblong in section and has one end open and the other closed. The housing is mounted within a yoke 11 and lies in a draft pocket defined by a pair of front stops 12 and a pair of rear stops 13 secured to the longitudinal sills 14 of the railway car. The yoke is provided at its front end with wings 15, between which extends the shank 16 of the coupler. The shank is connected to the yoke by a key 17 passing through openings in the shank and the wings of the yoke, and, at its rear end, the shank abuts a front follower 18, which lies in engagement with the inner faces of the front stops 12.

The housing contains two damped cushioning units, each made up of a pair of rubber shear blocks 19, a shoe 20, a wedge 21, and a plunger 22. Each shear block comprises an outer metal plate 19a, which engages the opposite side walls and the end wall of the housing, and a metal inner plate 19b, which is narrower than the width of the housing and initially lies spaced from the end of the housing and in contact with one side wall only thereof. The plates 19a, 19b are secured together by a mass of rubber 19c, which is bonded to areas on the opposed faces of the plates. The inner plates 19b of each pair of shear blocks are secured by bolts to a shoe 20, which has a pair of friction surfaces 20' and 20" on its front and rear faces, respectively, lying at an angle to each other. The rear friction surface of the shoe engages the friction surface on the front face of a wedge member 21, which is seated against one side wall and the end wall of the housing. The friction surface 21' on the forward face of the wedge lies at an angle of approximately 45° to the longitudinal axis of the housing. The outer plates 19a of one shear block of each unit lie in contact and are secured together by rivets 23.

The two cushioning units lie in reverse relation to each other, as shown in Fig. 3, so that the wedge member 21 of one unit bears against one side wall of the housing and the wedge member of the other unit bears against the other side wall of the housing. With this arrangement, the rubber masses of the shear blocks of one unit are initially offset from those of the shear blocks of the other unit. The plungers 22 of the cushioning units project out of the open end of the housing and engage the inner face of the front follower 18.

The closed rear end of the housing engages a cushioning unit 24 composed of a stack of rubber springs, each of which comprises a metal center plate 25 carrying masses of rubber 26 on opposite faces thereof. Adjacent springs in the stack are separated by flat divider plates 27 and the rear end of the stack bears against a follower 28, which normally lies in contact with the rear draft stops 13 and the rear end of the yoke 11. In order to place the gear under precompression, the plunger 22 of each unit may be connected by a tie bolt 29 to the rear follower 28. For this purpose, the plunger, shoe, and wedge of the unit are formed with aligned openings and similar openings are provided through the closed end of the housing and the rubber springs in the unit 24 and the rear follower. The openings in the plunger and rear follower are enlarged to receive the head of the bolt and the nut thereon and the opening through the shoe is also enlarged, so that the shoe may move laterally, when the gear is compressed.

In the use of the gear described, the application of a force in buff to the coupler causes its shank to force the front follower 18 to the rear. In this movement, the plungers 22 of the cushioning units in housing 10 are moved inwardly and this causes the shoe of each unit to move laterally along the friction surfaces of the plunger and the wedge, with which the shoe contacts. Such movement of the shoe of a unit causes a like movement of the inner plates 19b of that unit and the rubber masses 19c bonded to the moving inner plates and the stationary outer plates 19a are thereby subjected to a shearing stress. The inward movement of the plungers is transmitted through the shoes and wedge members to the rear wall of the housing, which serves as a movable abutment. As the applied force increases, the abutment is moved to the rear against the resistance of the rear cushioning unit 24, the rubber springs in unit 24 being compressed against the rear follower 28, which is held against movement by the rear draft stops 13. In the movement of the inner plates 19b of the shear blocks, as described, the edges of the associated outer plates 19a, which the inner plates are moving away from, are urged toward each other. In order to prevent such movement of the edges of the outer plates, the housing is provided with internal lugs or ribs 30 in position to engage the inner faces of the outer plates along one edge.

When a force in draft is applied to the coupler, the rear end of the yoke 11 moves forward and causes a similar movement of the rear follower 28. The rear cushioning unit 24 is compressed against the rear end of the housing and the housing advances, while its plungers 22 are held stationary against the inner face of the front follower 18. In such movement of the housing, the wedges 21 force the shoes 20 laterally against the resistance in shear of the rubber masses of the shear blocks.

With the construction described, it is possible to obtain a high capacity from the shear block cushioning units with a relatively small travel, and additional capacity is then afforded by the second cushioning unit 24. In the case of a severe impact against the front follower 18, that follower may cause the plungers 22 to move entirely into the housing, so that the folower is in contact with the front end of the housing. However, this does not cause the gear to go solid, since the spring unit 24 still provides cushioning effect against further inward movement of the front follower and housing. The same action takes place in draft, although it is unlikely that the forces in draft will be sufficient to cause the housing and front follower to come into contact.

Figure 4:
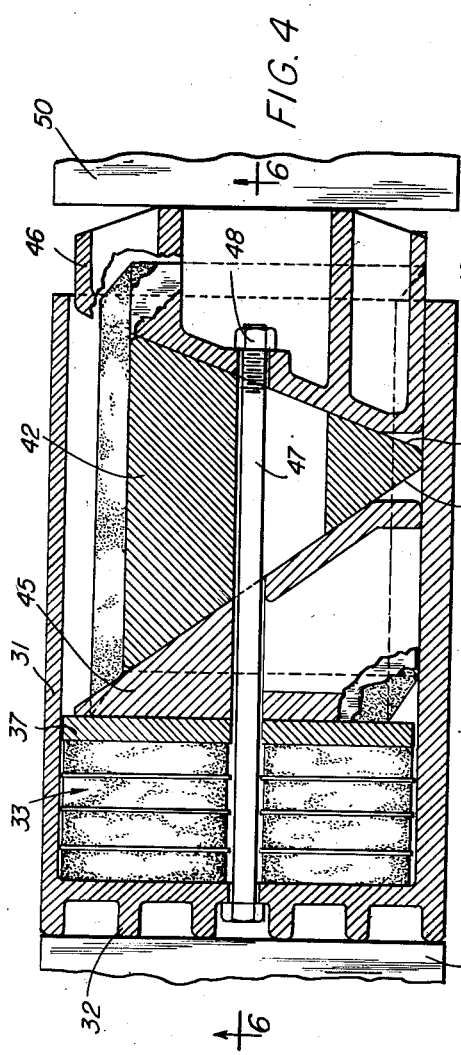
Fig. 4 is a longitudinal sectional view of a modified form of the new cushioning device on the line 4—4 of Fig. 5.
Figure 6:
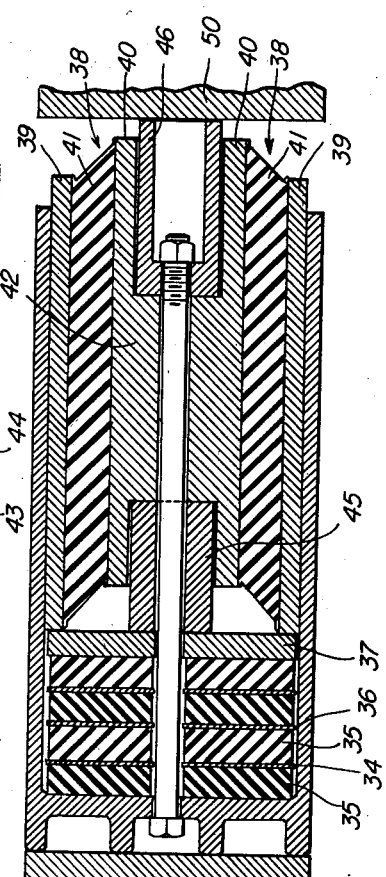
Fig. 6 is a sectional view on the line 6—6 of Fig. 4.

The form of the new gear shown in Figs. 4–6, incl., comprises a housing 31 having one end closed and strengthened by ribs 32 and the other end open. A cushioning unit 33 is seated against the inner face of the closed end of the housing and the unit comprises a plurality of rubber springs, each made up of a center plate 34 and masses of rubber 35 secured to opposite faces thereof. Adjacent springs in the unit are separated by a flat divider plate 36 and the outer end of the unit 33 is engaged by a follower or movable abutment 37.

The space within the housing 31 outwardly from follower 37 contains a cushioning unit including a pair of rubber shear blocks 38. Each block comprises an outer metal plate 39 lying against a wall of the housing and bearing against the outer face of follower 37. Each shear block also includes an inner plate 40, which is connected to the outer plate by a rubber mass 41 bonded to both plates. In the construction illustrated, the inner plates 40 of the two shear blocks are formed integrally with a shoe 42. The shoe has friction surfaces 43, 44 on its inner and outer faces, which lie at an angle to each other, and the inner friction surface 43 lies in contact with the similar surface on a wedge member 45 resting against the wall of the housing and in contact with the outer face of follower 37. The outer friction surface 44 on the shoe is engaged by a plunger 46, which projects out of the housing and is connected by a tie bolt 47 to the closed end of the housing. The bolt passes through aligned openings in the plunger, shoe, wedge, cushioning unit 33, and the end wall of the housing and the opening through the shoe is enlarged, so that the shoe may move laterally relative to the tie bolt. The tie bolt has a nut 48 within a cavity in the plunger and the nut may be taken up to place the cushioning device under initial compression.

In the normal condition of the device, the inner plates 49 of the shear blocks project out of the housing a substantial distance. The plunger 46 projects outwardly farther than the inner plates and the outer plates 39 project out of the housing a less distance than the inner plates. When the unit is used alone or with another as a draft gear, it is installed in a draft pocket within a yoke like yoke 11. The unit lies between a pair of followers 49, 50, of which follower 49 may engage the stops 12 at one end of the pocket and the follower 50 may engage the stops 13 at the other end of the pocket.

When the coupler is subjected to a force in buff, the follower 49 is moved inward and forces the housing toward the rear follower 50. In such movement of the housing, the plunger 46 is caused to enter the housing and it forces the shoe 42 laterally along the friction surfaces of the plunger and wedge member 45. At the same time, the inner plates 40 of the shear blocks are moved inwardly and laterally against the resistance in shear of the rubber masses 41 of the blocks. As the plunger and shoe move inwardly, force is applied to the inner follower 37 through the wedge member 45 and the outer plates 39 of the shear blocks and the follower compresses the cushioning unit 33. The inner plates 40 of the shear blocks ultimately engage follower 37 and, since the plunger 46 moves into the housing at a faster rate than the shoe and plates 40, the follower 50 will eventually make simultaneous contact with the plunger and the end of plates 40 and, thereafter, engage the outer ends of outer plates 39 of the shear blocks. From this point on, the rubber masses of the shear blocks offer no further resistance to the movement of the follower 50 and the yoke, but such movement is opposed by the cushioning unit 33.

When a force in draft is applied to the coupler, the action of the cushioning device is the same as that above described, except that the follower 49 remains in contact with the front stops 12 and the housing continues to bear against that follower. The rear follower 50 moves forwardly forcing plunger 46 into the housing with the movement opposed by the rubber masses of the shear blocks and the cushioning unit 33.

When the inner plates 40 of the shear blocks and the shoe 42 are moved into the housing, the edges 39a of the outer plates 39, which the inner plates are moving away from, are urged toward each other. This is undesirable and to prevent its occurrence, the housing is provided with longitudinal internal ribs 51 or equivalent lugs to engage and hold the edges 39a of plates 39 in position.

I claim:

1. A cushioning device, which comprises a pair of metal plates lying substantially parallel, a movable abutment engaged by one plate, the second plate being movable edgewise relatively to the first, a mass of rubber between the plates and bonded to areas on the opposed faces thereof, the rubber offering resistance in shear to the movement of the second plate relatively to the first, a shoe movable with the second plate and having a pair of spaced friction surfaces at an angle to each other, a wedge member engaging the abutment, the member having a friction surface in contact with one of the friction surfaces on the shoe, a plunger having a friction surface in contact with the other friction surface on the shoe, a plunger being movable to cause movement of the shoe, means for guiding the movement of the plunger, the friction surfaces on the shoe lying at an angle to the path of movement of the plunger, and resilient means resisting the movement of the abutment.

2. A cushioning device, which comprises a housing, a pair of metal plates lying substantially parallel within and lengthwise of the housing, a movable abutment engaged by one plate, the second plate being movable edgewise relatively to the first, a mass of rubber between the plates and bonded to areas on the opposed faces thereof, the rubber offering resistance in shear to the movement of the second plate relatively to the first, resilient means engaging part of the housing and resisting the movement of the abutment, and means for generating friction actuated by movement of the second plate relative to the first, said friction generating means including a wedge member engaging the abutment, a plunger projecting out of the housing, means for guiding the movement of the plunger, the wedge member and plunger having opposed friction surfaces lying at an angle to each other and to the path of movement of the plunger, and a shoe connected to the second plate and lying between the plunger and wedge member, the shoe having friction surfaces engaging those on the plunger and wedge member.

3. A cushioning device, which comprises a housing, a pair of metal plates lying substantially parallel within the housing, one of the plates lying against a wall of the housing and the second plate being movable edgewise relatively to the first, a movable abutment within the housing engaged by the first plate, a mass of rubber between the plates and bonded to areas on the opposed faces thereof, the rubber offering resistance in shear to the movement of the second plate relatively to the first, a shoe movable with the second plate, a member having a friction surface engaged by the shoe, the member engaging the abutment, resilient means resisting the movement of the abutment, and a plunger engaging the shoe and movable into the housing to cause movement of the shoe relatively to the member.

4. A cushioning device, which comprises a housing having a closed end and an open end, a pair of metal plates lying substantially parallel within the housing, one of the plates lying against a wall of the housing and the second plate being movable edgewise relatively to the first, a movable abutment within the housing engaged by the first plate, a mass of rubber between the plates and bonded to areas on the opposed inner faces thereof, the rubber offering resistance in shear to the movement of the second plate relatively to the first, a shoe movable with the second plate and having spaced friction surfaces at an angle to each other, a member having a friction surface engaging one of the friction surfaces on the shoe, the member engaging the abutment, resilient means seated against the closed end of the housing and resisting the movement of the abutment, a plunger in contact with the other surface on the shoe and movable to cause movement of the shoe relatively to the member, and means for guiding the plunger, the friction surfaces on the shoe lying at an angle to the movement of the plunger.

5. A draft gear for installation on a railway car between draft stops and within a yoke connected to a coupler, which comprises a housing having an open end and a closed end, a pair of metal plates lying substantially parallel within the housing, means holding the first plate in position, the second plate being movable relatively to the first lengthwise of the housing, a mass of rubber between the plates and bonded to areas on the opposed faces thereof, the rubber offering resistance in shear to the movement of the second plate relatively to the first, a wedge member seated on a part of the housing and having a friction surface, a shoe movable with the second plate and having a friction surface movable along the friction surface on the wedge member and a second friction surface at an angle to the first friction surface on the shoe, a plunger engaging the second friction surface on the shoe and movable with and relatively to the shoe, the plunger projecting out of the open end of the housing, a follower engaging the projecting end of the plunger, a second follower spaced from the closed end of the housing, and resilient means between the closed end of the housing and the second follower.

6. A draft gear for installation on a railway car between draft stops and within a yoke connected to a coupler, which comprises a housing having an open end and a closed end, a pair of metal plates lying substantially parallel within the housing, means holding the first plate in position, the second plate being movable relatively to the first lengthwise of the housing, a mass of rubber between the plates and bonded to areas on the opposed faces thereof, the rubber offering resistance in shear to the movement of the second plate relatively to the first, a wedge member seated on a part of the housing and having a friction surface, a shoe movable with the second plate and having a friction surface movable along the friction surface on the wedge member and a second friction surface at an angle to the first friction surface on the shoe, a plunger engaging the second friction surface on the shoe and movable with and relatively to the shoe, the plunger projecting out of the open end of the housing, a follower engaging the projecting end of the plunger, a second follower spaced from the closed end of the housing, resilient means between the closed end of the housing and the second follower, and means engaging the second follower and acting on the plunger to apply an initial load to the rubber mass and the resilient means.

7. A draft gear for installation on a railway car between draft stops and within a yoke connected to a coupler, which comprises a housing having an open end and a closed end, a pair of metal plates lying substantially parallel within the housing, means holding the first plate in position, the second plate being movable relatively to the first lengthwise of the housing, a mass of rubber between the plates and bonded to areas on the opposed faces thereof, the rubber offering resistance in shear to the movement of the second plate relatively to the first, a wedge member seated on a part of the housing and having a friction surface, a shoe movable with the second plate and having a friction surface movable along the friction surface on the wedge member and a second friction surface at an angle to the first friction surface on the shoe, a plunger engaging the second friction surface on the shoe and movable with and relatively to the shoe, the plunger projecting out of the open end of the housing, a follower engaging the projecting end of the plunger, a second follower spaced from the closed end of the housing, a resilient means between the closed end of the housing and the second follower, and a tie rod engaging the second follower and the plunger and applying an initial load to the rubber mass and the resilient means.

8. A cushioning device, which comprises a pair of shear blocks lying parallel and spaced apart, each block having an outer plate, an inner plate movable relatively to the outer plate, and a mass of rubber bonded to opposed areas on the inner faces of the plates and offering resistance in shear to the movement of the inner plate relatively to the outer plate, a movable abutment engaged by the outer plates of the blocks, a wedge member seated on the abutment and having a friction surface, a shoe having a pair of friction surfaces at an angle to each other, one of the surfaces being in contact with the friction surface on the wedge member and the shoe being attached to the inner plates of the shear blocks and movable along the friction surface on the wedge member, resilient means resisting the movement of the abutment with the inner plates and wedge member, and a plunger engaging the second friction surface on the shoe and movable to cause movement of the shoe along the friction surface on the wedge member.

9. A draft gear for installation on a railway car between draft stops and within a yoke connected to a coupler, which comprises a housing having an open end and a closed end, a pair of metal plates lying substantially parallel within the housing, means holding the first plate in position, the second plate being movable relatively to the first lengthwise of the housing, a mass of rubber between the plates and bonded to areas on their opposed faces, the rubber offering resistance in shear to the movement of the second plate relatively to the first, a wedge member within the housing seated against the closed end thereof and having a friction surface, a shoe movable with the second plate and having a friction surface movable along the friction surface on the wedge member and a second friction surface at an angle to the first friction surface on the shoe, a plunger projecting out of the housing and engaging the second friction surface on the shoe, the plunger being movable to cause movement of the shoe relative to the wedge member, and resilient means outside the housing in contact with the closed end thereof and engageable with the stops to resist movement of the housing with the wedge member.

References Cited in the file of this patent

UNITED STATES PATENTS

| | | |
|---|---|---|
| 740,349 | Wright et al. | Sept. 29, 1903 |
| 2,565,650 | Dath | Aug. 28, 1951 |
| 2,618,393 | Withall | Nov. 18, 1952 |
| 2,644,684 | Spence et al. | July 7, 1953 |